United States Patent [19]

Shoup

[11] 4,151,920
[45] May 1, 1979

[54] VEHICLE MAIN FRAME

[75] Inventor: Stephen G. Shoup, Peoria, Ill.

[73] Assignee: Caterpillar Tractor Co., Peoria, Ill.

[21] Appl. No.: 814,375

[22] Filed: Jul. 11, 1977

[51] Int. Cl.² .......................... E02F 3/80; B62D 27/00
[52] U.S. Cl. .................................... 414/697; 280/781; 414/729
[58] Field of Search .................. 180/64 R; 296/28 R; 214/130 R, 131 R, 147 R, 139, 140, 149; 280/781, 106 R

[56] References Cited

U.S. PATENT DOCUMENTS

| | | | |
|---|---|---|---|
| T966,007 | 1/1978 | Liehr | 214/140 X |
| 3,085,643 | 4/1963 | Schwartz | 180/6.7 X |
| 3,645,350 | 2/1972 | Deli | 280/781 X |
| 3,995,755 | 12/1976 | Wagner | 214/140 |

Primary Examiner—Husar, Francis S.
Assistant Examiner—George F. Abraham
Attorney, Agent, or Firm—C. E. Lanchantin, Jr.

[57] ABSTRACT

A vehicle main frame has a pair of arms individually having first, second and third portions, with the first and third portions being disposed in first and second upright and substantially longitudinally oriented planes transversely offset from one another, and with the second portions of the arms connecting the first and third portions. Joints are provided for mounting an implement with forces from the implement being transmitted to the first portions of the arms in substantial alignment with the first planes.

13 Claims, 8 Drawing Figures

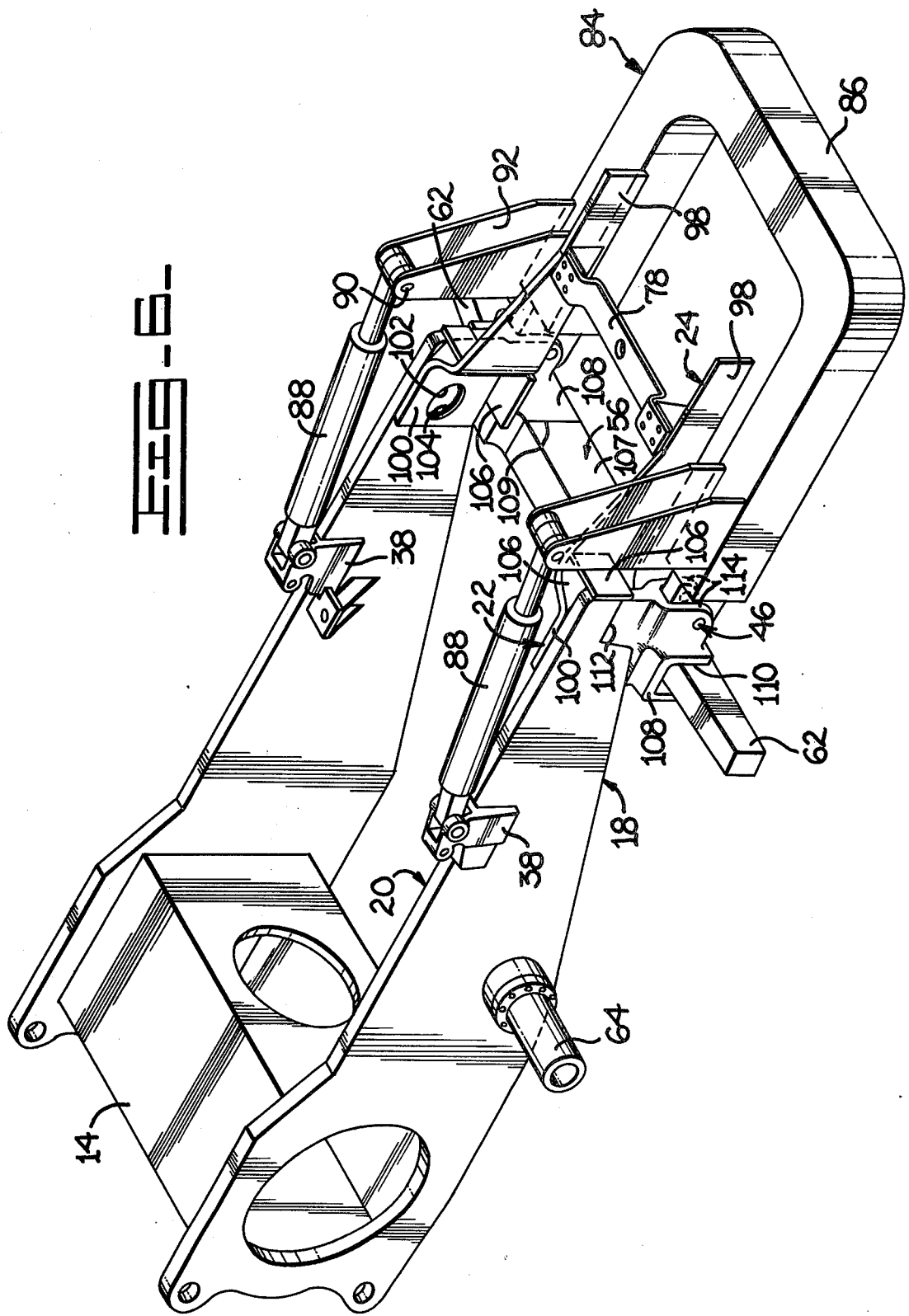

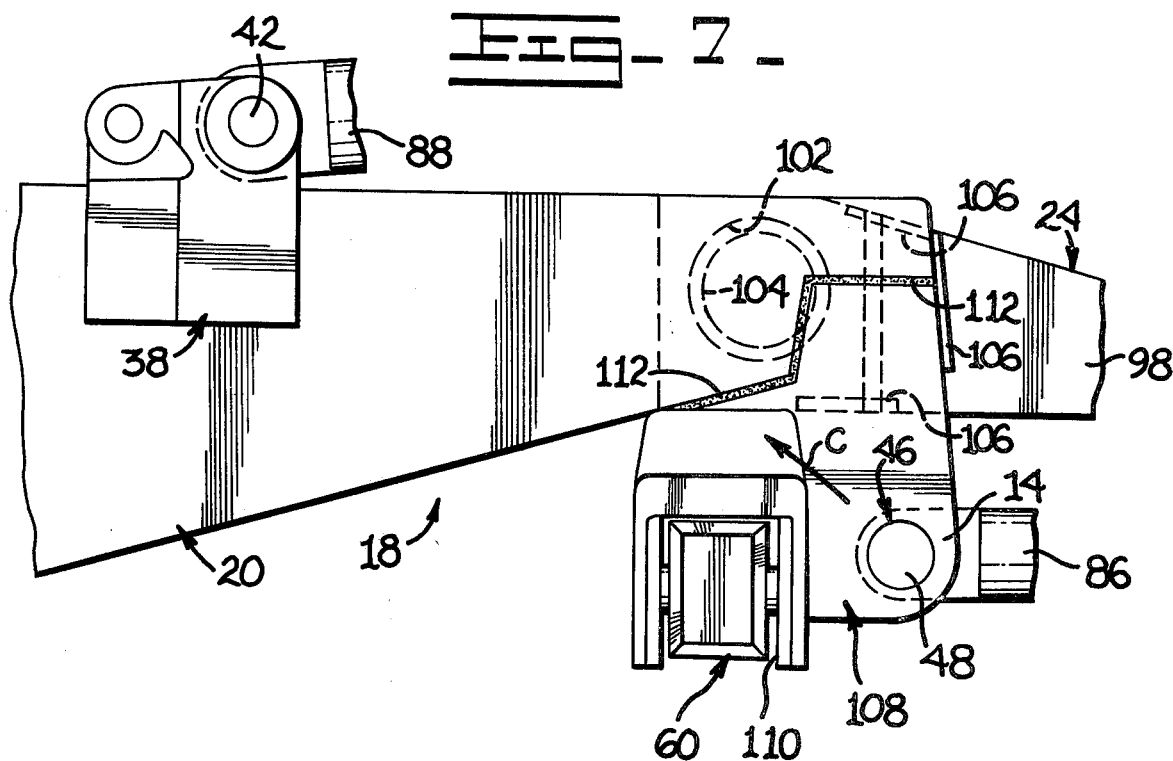
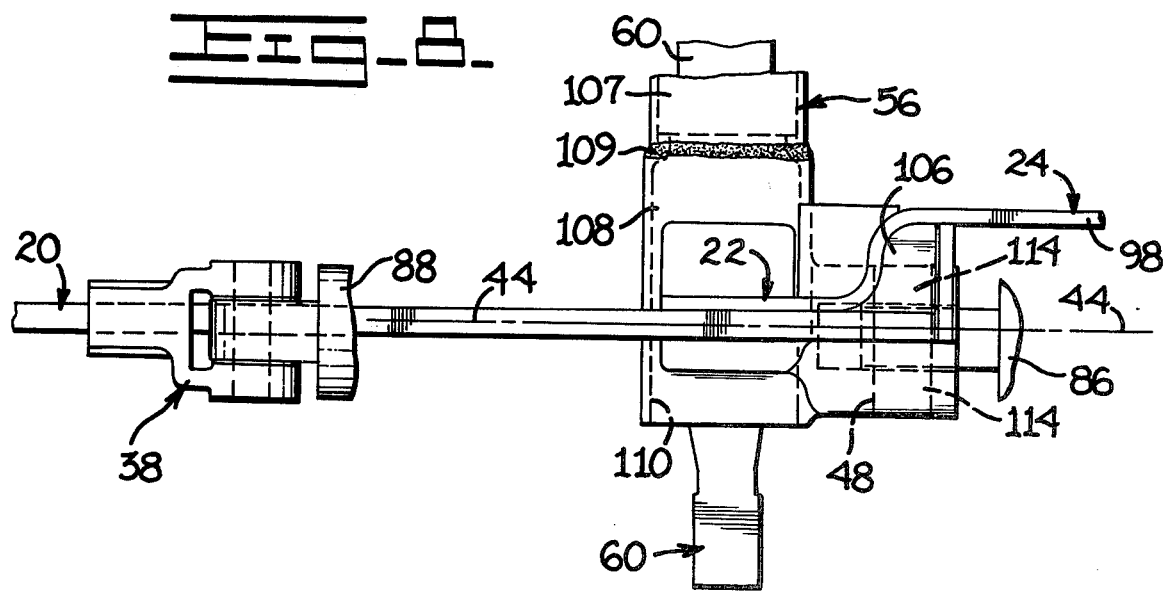

VEHICLE MAIN FRAME

BACKGROUND OF THE INVENTION

This invention relates generally to a vehicle main frame having a pair of arms, and more particularly to a main frame for more effectively transmitting forces from an implement through the arms thereof.

In general, many vehicles such as a track-type tractors or the like have a pair of parallel arms, a saddle connected between the arms, and an equalizer bar pivotally mounted to the saddle. The ends of the equalizer bar are in turn seated on an opposite pair of vehicle undercarriages or track roller frames pivotally secured to the body of the tractor.

In the past, however, implements such as a C-frame mounted bulldozer blade have been pivotally mounted to the outside of such oscillating frames roller frame because of several problems that develop when any attempt is made to mount them on the inside thereof. For example, only a minimum of lateral clearance exists between the main frame arms and the track roller frames to that for the most part previous inside mounted C-frames have been limited to those tractors having non-oscillating track roller frames. Unfortunately, there are many disadvantages to such fixed undercarriages including poorer vehicle maneuverability over irregular terrain and loss of traction under adverse footing conditions.

Another problem with inside mounted C-frames, is that they have been heretofore connected to the main frame arms on outstanding pins in such a manner that they have imposed undesirable twisting loads and fatigue stresses on the main frame arms. Accordingly, these arms have been made more rigid and costly in construction in order to withstand the high forces of the bulldozer blade. Another disadvantage is that these heavier arms are often deeper in cross section, which imposes servicing problems because certain components of the tractor are then not conveniently accessible. Furthermore, these C-frames have been coupled to the main frames at elevationally low pivot axes so that there has been less ground clearance under the frames.

Therefore, it can be appreciated that it would be advantageous to provide a vehicle with a pivotal equalizer bar to allow the track roller frames to oscillate for better maneuverability and overall operation of the tractor, and also an inside mounted implement that can more effectively distribute working forces into the main frame arms and can thereby overcome the problems associated with the prior art. Also, inside mounting of the implement reduces the vehicle width to the width of the usual blade.

SUMMARY OF THE INVENTION

The present invention is directed to overcoming one or more of the problems as set forth above.

According to the present invention this is accomplished by providing a vehicle main frame having a pair of arms individually having first, second and third portions, with the first and third portions being disposed in first and second upright and substantially longitudinally oriented planes transversely offset from one another, and with the second portions of the arms connecting the first and third portions. Joints are provided for mounting an implement, with forces from the implement being transmitted to the first portions of the arms in substantial alignment with the first planes.

BRIEF DESCRIPTION OF THE DRAWINGS

FIG. 6 is a diagrammatic perspective view of a second alternate embodiment main frame embodying the construction of the present invention.

FIG. 7 is a fragmentary and enlarged diagrammatic side elevational view of the second alternate embodiment main frame shown in FIG. 6.

FIG. 8 is a top plan view of the main frame shown in FIG. 7.

DETAILED DESCRIPTION

Figure 1:
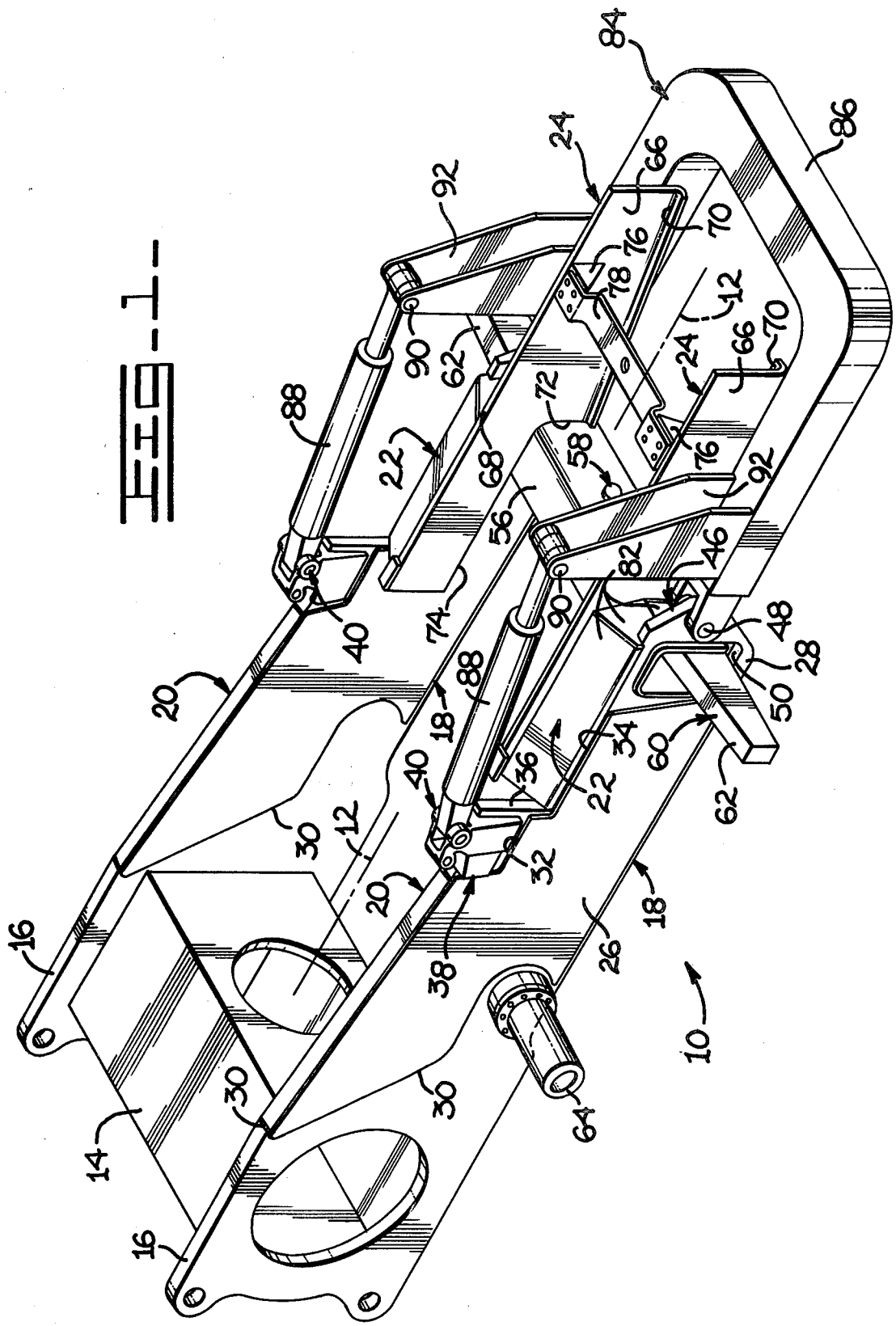
FIG. 1 is a diagrammatic perspective view of a vehicle main frame having the construction of the present invention.

Referring initially to FIG. 1, there is shown a vehicle main frame 10 having a central longitudinal axis 12 corresponding to the normal direction of travel of the vehicle. When viewing these figures the right hand side thereof will hereinafter be identified as the front or forward part thereof, and the left hand side will be referred to as the rear or rearward part.

The main frame 10 generally includes a transversely extending rear case or housing 14 having a pair of elongated and upright sidewalls 16, and a pair of contoured arms identified generally by the reference numeral 18 connected to the case in integrally forwardly extending relation from the sidewalls. Each of the arms has in generally serially connected order a first or rear portion 20, a second or central portion 22 and a third or front portion 24.

In the instant example, the first or rear portion 20 of each of the arms 18 is of compound construction consisting of an upright box beam 26 at the rear end thereof and a single upright plate 28 at the front end. The rear end of each box beam is interlockingly welded to the respective sidewall 16 along a generally encircling weld joint 30. Further, each box beam converges with forward extension thereof and is provided with a first step 32 and a second step 34 at the upper edge thereof. As shown in more detail in FIGS. 2 and 3, a contoured upright anchor plate 36 is weldably and interlockingly secured to the top of each of the box beams along the first and second steps to provide a rigid mount for an upstanding mounting bracket 38. Each mounting bracket is bifurcated so that it straddles the anchor plate and is preferably weldably connected thereto. The mounting brackets provide a lift pivot joint 40 at the upper front portions thereof including a transversely and horizontally oriented pivot pin 42.

Figure 2:
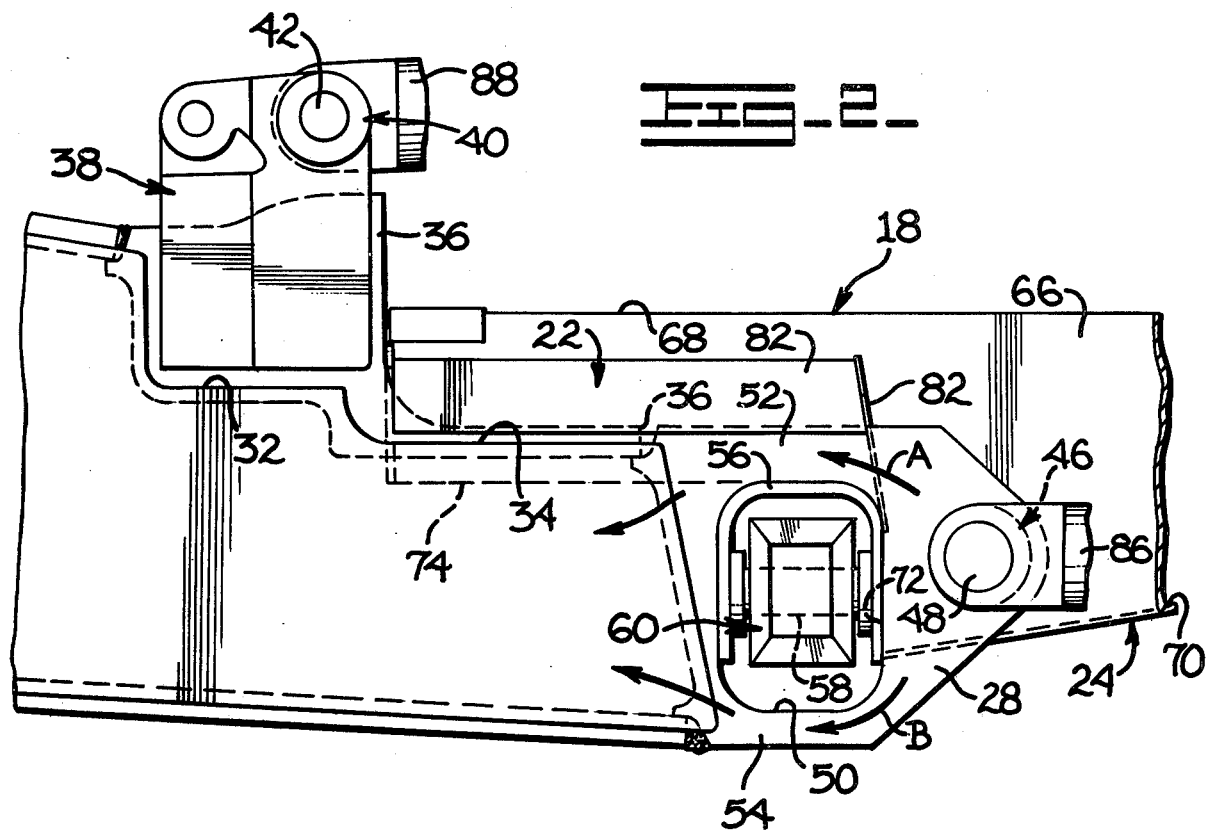
FIG. 2 is an enlarged diagrammatic side elevational view of a portion of the main frame shown in FIG. 1.
Figure 3:
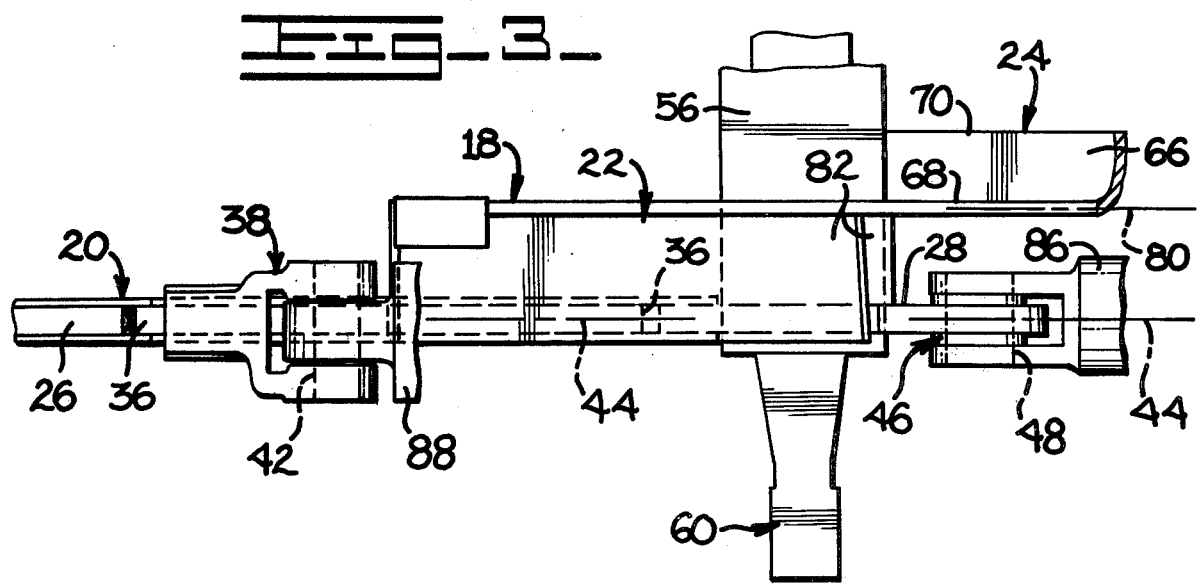
FIG. 3 is a fragmentary and enlarged diagrammatic top plan view of the same portion of the main frame as in FIG. 2.

As is best shown in FIG. 3, the rear portions 20 of the arms 18 extend longitudinally in a first upright plane 44 parallel to the central longitudinal axis 12 of the vehicle. The rear box beam 26 and the front plate 28 are aligned on that plane, and the plate extends rearwardly and interlockingly into the box beam and is weldably connected thereto. An implement mounting pivot joint 46 which is adapted to receive a transversely and horizontally oriented pivot pin 48 is disposed on the front end of each of the plates 28, and a relatively large transverse opening 50 is formed through the solid plates between the front and rear ends thereof. As will hereinafter be more completely explained, each opening 50 advantageously defines an upper bridging body portion 52 and a lower bridging body portion 54 as best shown in FIG. 2 to better transmit forces from the pivot joints 46 rearwardly into the rear portions of the arms.

Referring to FIG. 1, a transversely extending hollow saddle 56 is shown which is preferably an inverted, U-shaped channel. This saddle preferably extends interlockingly into or through the openings 50 in the opposite solid front plates 28, and is weldably secured thereto. A longitudinally oriented pivot joint identified generally by the reference numeral 58 is pivoted in the saddle substantially on the control plane through the axis 12 for pivotally mounting an equalizer bar 60. Thus the centrally mounted equalizer bar can oscillate protectedly within the saddle in a generally upright transverse plane, with the opposite ends 62 thereof extending laterally outwardly through the openings 50.

The vehicle main frame 10 is preferably supported rearwardly thereof by a laterally outwardly extending cylindrical support shaft 64 suitably connected to each of the arms 18. The main frame is supported forwardly thereof by the equalizer bar 60. Particularly, a pair of similar, laterally spaced undercarriages such as conventional track roller frames, not shown, are connected to the respective support shafts 64 for pivotal movement in essentially vertical and longitudinally oriented planes. The ends 62 of the equalizer bar are supported on the oscillatable undercarriages in the usual manner. Reference is made to U.S. Pat. No. 3,871,462 issued Mar. 18, 1975 to R. L. Krolak for an understanding of such general type of support system.

Turning now to the instant construction of the third or front portion 24 of each of the arms 18, it is basically a single upstanding plate 66 having a substantially horizontal upper edge 68, a rearwardly depending and diverging lower front rolled edge 70 for strength, a rearwardly facing shoulder 72 which abuts the front of the saddle 56, and a horizontal lower rear edge 74 which abuts the top of the saddle. Preferably, each of the front plates is welded to the saddle and has a mounting platform 76 connected to the laterally inside front surface thereof so that a transverse engine support bar 78 may be releasably connected to the opposite platforms. This bar thereby stabilizes the front ends of the arms. As representatively shown in FIG. 3, at least the distal or front end of each of the front plates 66 extends longitudinally in substantially a second upright plane 80 which is transversely offset from the first upright plane 44 of the rear portion 20 of the arms.

The second or central portion 22 of each of the arms 18 includes the laterally outward end of the aforementioned saddle 56 and also a plurality of appropriately profiled plates 82 which are generally transversely oriented in construction for bridgingly interconnecting the respective rear portions 20 and the front portions 24 of the arms. It may therefore be appreciated that the central portions serve to connect the relatively heavier and deeper rear portions from the relatively lighter and shallower front portions while maintaining the laterally offset condition thereof.

With reference to FIG. 1, a front-mounted implement 84 is advantageously pivotally mounted on the pivot joints 46. Specifically, the implement includes a C-frame 86 mounted at its rearward ends on the pivot pins 48, and a pair of fluid operated linear actuators or telescoping lifting jacks 88. Each lifting jack is rearwardly connected to a respective one of the pivot pins 42 of the upstanding mounting brackets 38, and is longitudinally oriented and connected to a pivot pin 90 secured to a relatively larger upstanding mounting bracket 92 on each side of the C-frame. In this way the lifting jacks can maintain the C-frame in a generally forwardly extending horizontal working position, or can elevate or lower the front end of the C-frame about the axis of the pins 48.

Although it is not shown in the drawings for illustrative convenience, it is to be appreciated that a tool such as an earthmoving bulldozer blade is preferably connected to the front of the C-frame 86. Thus, in operation, heavy loads on the tool and the C-frame are generally transferred horizontally rearwardly through the pins 48, the front plate 28, and the rear box beam 26 to the case 14, and including the sidewalls 26. In accordance with a major feature of the present invention such high forces are rearwardly directed to the front end of the rear portions 20 of the arms 18 in substantially load bypassing relation to the central portions 22 and front portions 24. This is extremely advantageous from the standpoint that only the rear portions of the arms need then be of a substantial cross section or of a construction having a maximum of structural integrity. Particularly, the front portions 24 of the arms can be of more lightweight and economical construction since the heavy loads of the implement are not passing therethrough.

Another advantage of the construction of the present invention resides in the substantial longitudinal alignment of both arms of the C-frame 86 and the respective lifting jacks 88 with the first upright planes 44 passing centrally through the rear portions 26 of the arms. As best shown in FIG. 3, the loads on the pins 48 are directed symmetrically rearwardly through the respective plates 28 and the box beams 26 substantially along the planes 44. Also, operating loads on the lifting jacks 88 are transmitted symmetrically rearwardly through the pins 42 and the mounting brackets 38 to the box beams substantially along the same planes. This construction minimizes the distortion resulting from prior art structures wherein C-frame and lifting jack loads were directed rearwardly to the arms via laterally offset joints secured to the arms.

Still another advantage of the preferred instant example resides in the ability of the arms 18 to transmit loads rearwardly from the implement 84 through preselected upper and lower paths immediately adjacent the openings 50 for the pivoting equalizer bar 60. Particularly, as shown in FIG. 2, loads are communicated rearwardly through both the upper and lower bridging body portions 52 and 54 as respectively indicated by the load-indicating arrows A and B. This may be referred to as an "enclosed saddle" construction, as opposed to the prior art "open saddle" form of construction which has a downwardly opening recess in the main frame arms and therefor is constructed to transmit such high forces rearwardly only along the upper path A. As a result of the ability to transmit forces through both the upper and lower paths the cross sectional height of the arms in this area can be reduced. This presents not only certain economical advantages, but also a less restricted access path to components within the vehicle which may require servicing.

FIRST ALTERNATE EMBODIMENT

Figure 4:
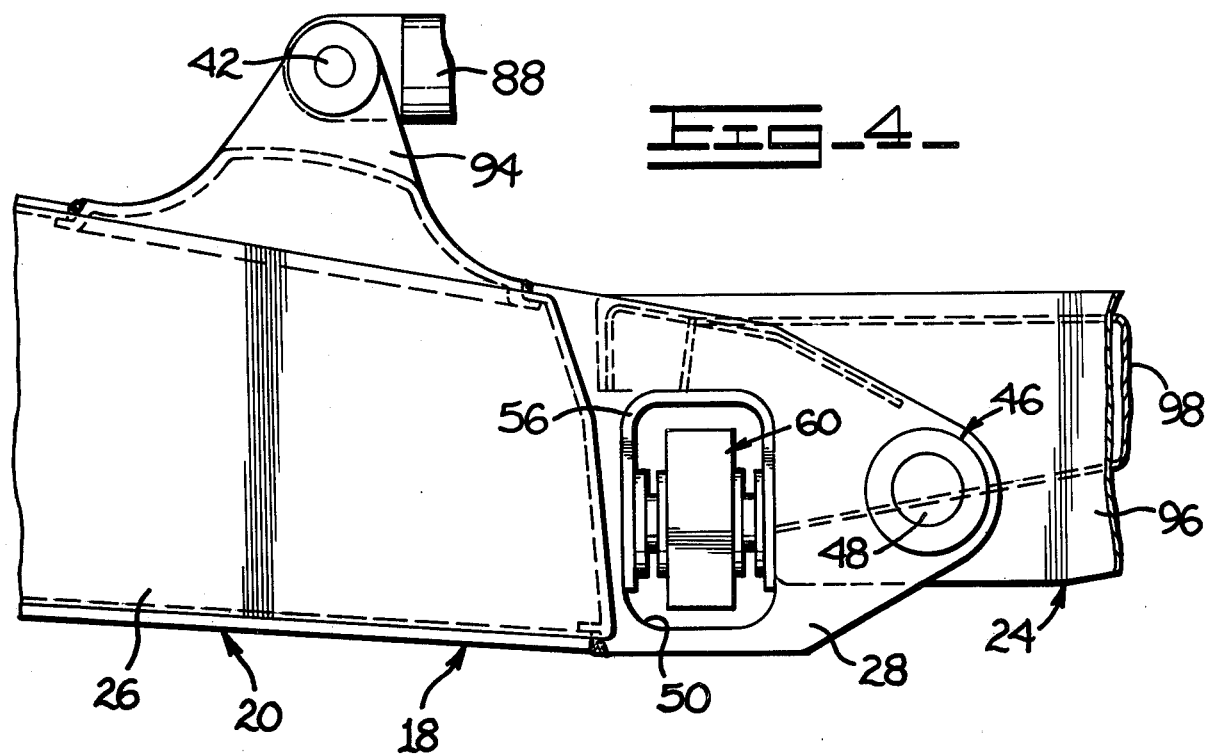
FIG. 4 is a fragmentary and diagrammatic side elevational view of an alternate embodiment vehicle main frame which may be compared with FIG. 2.
Figure 5:
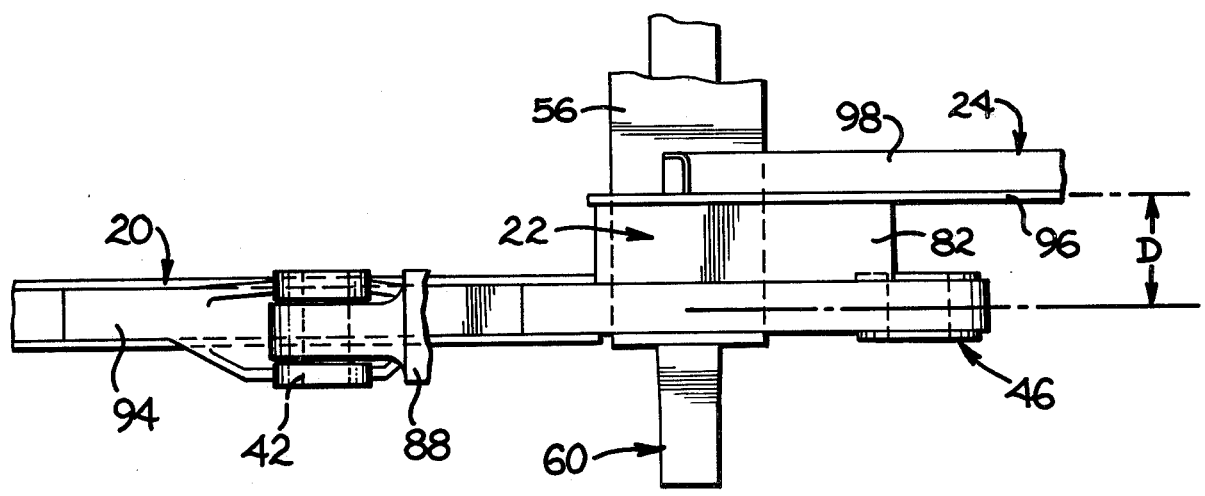
FIG. 5 is a top plan view of the main frame illustrated in FIG. 4.

Referring to FIGS. 4 and 5, another embodiment of the present invention is shown in which generally like parts carry like reference numerals. As in the preferred embodiment, the rear portion 20 of each of the main frame arms 18 includes a rear box beam 26 and a front plate 28. The front plates 28 are preferably solid in cross section, as opposed to a hollow box section, since the large opening 50 through each one would weaken or unduly complicate the construction of the arms thereat if a hollow structure were utilized.

In this embodiment the upper part of the box beam 26 is simplified and a lifting jack mounting bracket 94 of somewhat different shape is interlockingly insertably welded to the beam at the upper edge thereof. The front portion 24 has an upright main plate 96 of generally forwardly converging rectangular cross section and a channel 98 weldably secured to the inside surface thereof for additional strength and rigidity. One or more plates 82 and the saddle 56 make up the central portion 22 of the arms and, substantially as herein before stated, the longitudinally extending front portion 24 is laterally inwardly offset a preselected distance D as indicated on FIG. 5 from the longitudinally extending rear portion 20 of the arms in order to allow the C-frame 86 to be alignably connected to the mounting pivot joints 46.

SECOND ALTERNATE EMBODIMENT

Referring next to FIGS. 6, 7 and 8, a second alternate embodiment is shown, wherein the rear portions 20 of the arms 18 are of forwardly converging solid rectangular cross section substantially throughout their length and are integral with the sidewalls 16 of the case 14. Moreover, each of the central portions 22 of the arms differs from the previously described embodiments in that a single lightweight and forwardly converging contoured plate 98 makes up a major portion thereof and is integral with the forward portion 24. Note is made that in the instant embodiment each of the plates 98 has a rear part 100 with a large transverse opening 102 therethrough so that an annular fillet weld joint 104 can be used to secure the plates against the rear portions 20 as shown in FIGS. 6 and 7. A plurality of strengthening gusset or reinforcing plates 106 are welded to the plates 98 to the rear portions 20 of the arms and to the saddle 56 for rigidifying and completing the structural integrity of this offset connection.

The second alternate embodiment differs in a major respect from the first two constructions described above in that the saddle 56 is of composite construction including a foreshortened and inverted U-shaped channel 107 and a pair of opposite casting members 108 symmetrically connected thereto by a pair of encircling weld joints 109. These three members jointly provide an inverted U-shaped channel or recess 110 for receiving the oscillatable equalizer bar 60. The undersides of the rear portions 20 of the arms are contoured or stepped to interlockingly mate with the topside of the casting members and to permit a weld joint 112 of extended length to individually connect them with improved structural integrity. The pivot joints 46 include a pair of parallel ears 114 formed in the front lower portion of each of the casting members, which joints support the C-frame 86 through the pivot pins 48 substantially in force transmitting alignment with the first upright plane 44 passing centrally and longitudinally through the rear portion 20. The lifting jacks 88 likewise are substantially alignably mounted for load transmission substantially along the same plane.

In operation, and as best illustrated in FIG. 7, rearward forces from the C-frame 86 are transmitted rearwardly through a single major path in the connecting casting members 108 to each of the rear portions 20 of the arms as indicated by the load indicating arrow identified by the letter C. This is achieved, like the first two embodiments, in load bypassing relation to the front portions 24 of the arms so that they can desirably be made more lightweight in overall construction with the accompanying advantages thereof. While this embodiment does not have the dual path load transmitting capability described previously, it has the advantage that the unified saddle and casting members may be directly lowered on or raised from the equalizer bar to provide a substantial assembly and disassembly advantage.

It should be understood that the rear portions 20 of the arms 18 can be modified to contain the downwardly facing recess 110, without utilizing the separate casting members 108, and the channel 107 laterally extended to pass within the recesses and to be directly weldably connected to the rear portions of the arms.

Thus, it is apparent that the vehicle main frame 10 of the present invention provides a construction better able to transmit forces from an implement rearwardly into the contoured arms thereof. Since the opposite arms of the C-frame of the implement are longitudinally aligned with only the major rear portions of the arms and transmit loads directly thereto, the minor front portions of the arms can be desirably reduced in size to effect economy in construction and greater accessibility to components within the vehicle for servicing purposes. Moreover, since the C-frame is substantially longitudinally aligned with the front end of the rear portions of the arms, rather than being mounted laterally offset therefrom, there is no longer a substantial problem in locating the pivoting undercarriages in juxtaposed relation to the arms.

Other aspects, objects and advantages will become apparent from a study of the specification, drawings and appended claims.

The embodiments of the invention in which an exclusive property or privilege is claimed are defined as follows:

1. A vehicle main frame having a longitudinal axis and forward and rearward parts thereof, the frame being partially supported by an equalizer bar, comprising:

a pair of arms individually having first, second and third portions, each of said first portions extending substantially longitudinally in a first upright plane, each of said third portions extending substantially longitudinally in a second upright plane transversely offset from said first upright plane, each of said second portions connecting said first and third portions;

each of said first portions having a forward end and a transverse opening of a construction sufficient for equalizer the equalizer bar; equalizer bar mounting means extending between said first portions at said openings; and a mounting joint on each of said forward ends of said first portions forwardly of said openings for mounting an implement and transmitting forces rearwardly from said implement thereto in substantial alignment with said first upright planes.

2. The vehicle main frame of claim 1 wherein each of said forward ends consists essentially of a single upright plate, each of said openings defining upper and lower bridging body portions in said plates, said bridging body portions being of a construction sufficient for transmitting forces from said implement in a dual path through each of said plates.

3. The vehicle main frame of claim 2 including a pivot joint on each of said first portions of the arms, and wherein said implement includes a C-frame and a pair of fluid operated linear actuators connected between said C-frame and said pivot joints for pivotally raising and lowering said C-frame on said mounting joints of the arms.

4. The vehicle main frame of claim 1 wherein said mounting means includes a transversely extending hollow saddle connected between said forward ends of the arms at said transverse openings.

5. The vehicle main frame of claim 4 wherein said saddle is an inverted, U-shaped channel extending within said transverse openings and is welded to said forward ends of the arms.

6. The vehicle main frame of claim 1 wherein said second and said third portions of both of the arms are formed primarily from a single forwardly converging contoured plate, each of said plates being welded to said first portion of the respective arms.

7. The vehicle main frame of claim 1 wherein each of said mounting joints includes a pair of ears substantially symmetrically aligned with said first planes of the arms, said implement being connected to said ears.

8. The vehicle main frame of claim 1 wherein said first portion of each of the arms has a rearward end, each of said forward ends being a casting member welded to a respective one of said rearward ends, and wherein said mounting means includes an inverted U-shaped channel welded to said casting members.

9. A vehicle main frame partially supported by an oscillatable equalizer bar and having a central longitudinal axis and forward and rearward parts thereof, comprising:
a transversely extending case;
a pair of arms individually having first and second ends, each of said first ends of the arms being connected to said case and extending substantially longitudinally therefrom in an upright plane generally parallel to said axis;
a transverse opening of a construction sufficient for freely receiving the equalizer bar formed through each of said arms between said first and second ends and defining upper and lower bridging body portions; means extending transversely of said arms and having said equalizer bar attached thereto; and
a pair of mounting joints for pivotally securing an implement to said arms, said mounting joints being disposed at said second ends of the arms and being of a construction sufficient for transmitting forces rearwardly from said implement through said upper and lower bridging body portions to said case substantially alignably along said planes of the arms.

10. The vehicle main frame of claim 9 wherein said second ends of the arms are solid in cross section.

11. The vehicle main frame of claim 10 wherein said means includes an inverted U-shaped channel transversely connected between said solid ends of the arms and being aligned with said openings.

12. The vehicle main frame of claim 9 including a pair of pivot joints on said arms, said implement including a C-frame pivotally connected to said mounting joints and a pair of linear actuators connected to said C-frame and to said pivot joints substantially alignable along said planes of the arms for raising and lowering said C-frame.

13. A vehicle main frame having a longitudinal axis and forward and rearward parts thereof, comprising:
a pair of contoured arms individually having a rear longitudinally extending portion, a front longitudinally extending portion, and a central transversely extending connector portion, each of said rear portions having a front end laterally offset from said front portions, each of said front ends defining an opening therethrough;
a saddle transversely connected to said front ends of the rear portions of the arms at said openings;
an equalizer bar pivotally mounted to said saddle and extending freely outwardly through said openings; and
mounting joint means on said rear portions of the arms for pivotally mounting an implement.

* * * * *

UNITED STATES PATENT AND TRADEMARK OFFICE
CERTIFICATE OF CORRECTION

PATENT NO. : 4,151,920
DATED : May 1, 1979
INVENTOR(S) : Stephen G. Shoup

It is certified that error appears in the above-identified patent and that said Letters Patent are hereby corrected as shown below:

In column 6, line 64 the word "equalizer", in first instance, should be -- receiving --.

Signed and Sealed this

Eleventh Day of September 1979

[SEAL]

Attest:

LUTRELLE F. PARKER

Attesting Officer     Acting Commissioner of Patents and Trademarks